United States Patent
Herman et al.

(10) Patent No.: US 9,694,693 B1
(45) Date of Patent: Jul. 4, 2017

(54) CONTROL SYSTEM FOR MULTI-PURPOSE VEHICLE

(71) Applicant: Denver Global Products, Lincolnton, NC (US)

(72) Inventors: Sean Herman, Hickory, NC (US); Sean Hicks, Charlotte, NC (US); James E. Parry, Monroe, NC (US)

(73) Assignee: Denver Global Products, Inc., Lincolnton, NC (US)

( * ) Notice: Subject to any disclaimer, the term of this patent is extended or adjusted under 35 U.S.C. 154(b) by 283 days.

(21) Appl. No.: 14/329,579

(22) Filed: Jul. 11, 2014

Related U.S. Application Data (60) Provisional application No. 61/845,144, filed on Jul. 11, 2013.

(51) Int. Cl.
  *B60L 1/00* (2006.01)
  *B60L 3/00* (2006.01)
  *H02G 3/00* (2006.01)
  *B60L 11/12* (2006.01)

(52) U.S. Cl.
  CPC ............... *B60L 11/12* (2013.01); *B60L 1/003* (2013.01)

(58) Field of Classification Search
  CPC .................. B60L 1/003; B60L 11/12
  USPC .......................................................... 307/10.1
  See application file for complete search history.

(56) References Cited

U.S. PATENT DOCUMENTS 6,534,959 B1 * 3/2003 Anderson ............... H02J 7/166
322/27

* cited by examiner

*Primary Examiner* — Carlos Amaya
(74) *Attorney, Agent, or Firm* — Additon, Higgins & Pendleton, P.A.

(57) ABSTRACT

A control system for use in generating power in a hybrid vehicle having at least one motor supplied with both generated power and battery stored potential, includes a voltage regulator transmitting an excitation current to the generator in response to the input alternating (AC) current. A rectifier receives an output alternating (AC) current from the voltage regulator and distributes a direct (DC) output current to the motor via a motor controller and inverter. The output voltage determines a feedback signal transmitted back to the excitation current in response to the feedback signal. The inverter receives the output voltage and powers an alternating current motor connected to the control system. The battery connects in a parallel electrical circuit to the motor and the output voltage to compensate for fluctuations in the output voltage. The inverter brakes the motor in response to a reduction in motor power consumption.

3 Claims, 6 Drawing Sheets

CONTROL SYSTEM FOR MULTI-PURPOSE VEHICLE

CROSS REFERENCE TO RELATED APPLICATIONS

This application claims priority to and incorporates entirely by reference U.S. Provisional Patent Application Ser. No. 61/845,144 filed Jul. 11, 2013, and entitled Control System for Multi-Purpose Vehicle.

FIELD OF THE INVENTION

The invention relates to multi-purpose vehicles having a built-in generator for providing power to motor controllers and/or outlets for accessories.

BACKGROUND

Numerous households utilize multiple kinds of small, motor driven vehicles for hobbies, yard work, hauling, or just for recreational driving. It is common for families to own riding lawn mowers, all-terrain vehicles (ATVs), go-carts, golf carts, and the like.

There has been a demand in the marketplace and a need in the art of motor driven household vehicles for multi-purpose vehicles (MPVs) that are suitable for using in more than one environment. A multi-purpose vehicle can be useful for hauling loads or for recreational driving, and in certain embodiments, the MPVs include attachments such as lawn mower blades that have additional motors that are separate from the drive motor. There is also a need for users to access power from the MPVs for certain power needs for other equipment or even lighting and communications. While some small devices can use the DC voltage available from a standard 12 volt "cigarette lighter" type of outlet, more sophisticated accessories need the power available from a standard 120 VAC outlet. By including a generator on board the MPV, the device disclosed herein meets these requirements, and the generator power control circuitry shown in the figures implements an MPV generator as described.

BRIEF SUMMARY OF THE DISCLOSURE

A control system for modulating voltage output from a generator in response to a load has a voltage regulator receiving an input alternating (AC) current from the generator and transmitting an excitation current to the generator in response to the input alternating (AC) current. The system further includes a rectifier receiving an output alternating (AC) current from the voltage regulator and distributing a direct (DC) output current to the load, wherein the rectifier defines at least one output node and a ground node at which the output voltage is available for distribution. The output voltage determines a feedback signal transmitted back to the voltage regulator, and the voltage regulator adjusts the excitation current in response to the feedback signal.

In another embodiment, a control system for operating at least one motor via a generator and a battery has a voltage regulator receiving an input alternating (AC) current from the generator and transmitting an excitation current back to the generator in response to the input alternating (AC) current. A rectifier receives an output alternating (AC) current from the voltage regulator and distributes a direct (DC) output current to the motor, and the rectifier defines at least one output node and a ground node at which an output voltage is available for distribution to the battery and the motor. The output voltage determines a feedback signal transmitted back to the voltage regulator, and the voltage regulator adjusts the excitation current in response to the feedback signal.

A system for use in generating power in a hybrid vehicle has at least one motor supplied with both generated power and battery stored potential and includes a voltage regulator receiving an input alternating (AC) current from the generator and transmitting an excitation current to the generator in response to the input alternating (AC) current. A rectifier receives the output alternating (AC) current from the voltage regulator and distributes a direct (DC) output current to the motor. This is accomplished via the rectifier defining at least one output node and a ground node such that an output voltage is available for distribution to the battery and the motor. The output voltage determines a feedback signal transmitted back to the voltage regulator, the voltage regulator adjusts the excitation current in response to the feedback signal. An inverter receives the output voltage and powers an alternating current motor connected to the control system.

A control system for use in generating power in a hybrid vehicle having at least one motor supplied with both generated power and battery stored potential, includes a voltage regulator receiving an input alternating (AC) current from the generator and transmits an excitation current to the generator in response to the input alternating (AC) current. A rectifier receives an output alternating (AC) current from the voltage regulator and distributes a direct (DC) output current to the motor. In other words, the rectifier defines at least one output node and a ground node such that an output voltage is available for distribution to the battery and the motor. The output voltage determines a feedback signal transmitted back to the excitation current in response to the feedback signal. An inverter receives the output voltage and powers an alternating current motor connected to the control system. The battery connects in a parallel electrical circuit to the motor and the output voltage to compensate for fluctuations in the output voltage. In one embodiment, an inverter brakes the motor in response to a reduction in motor power consumption.

DESCRIPTION

Figure 1:
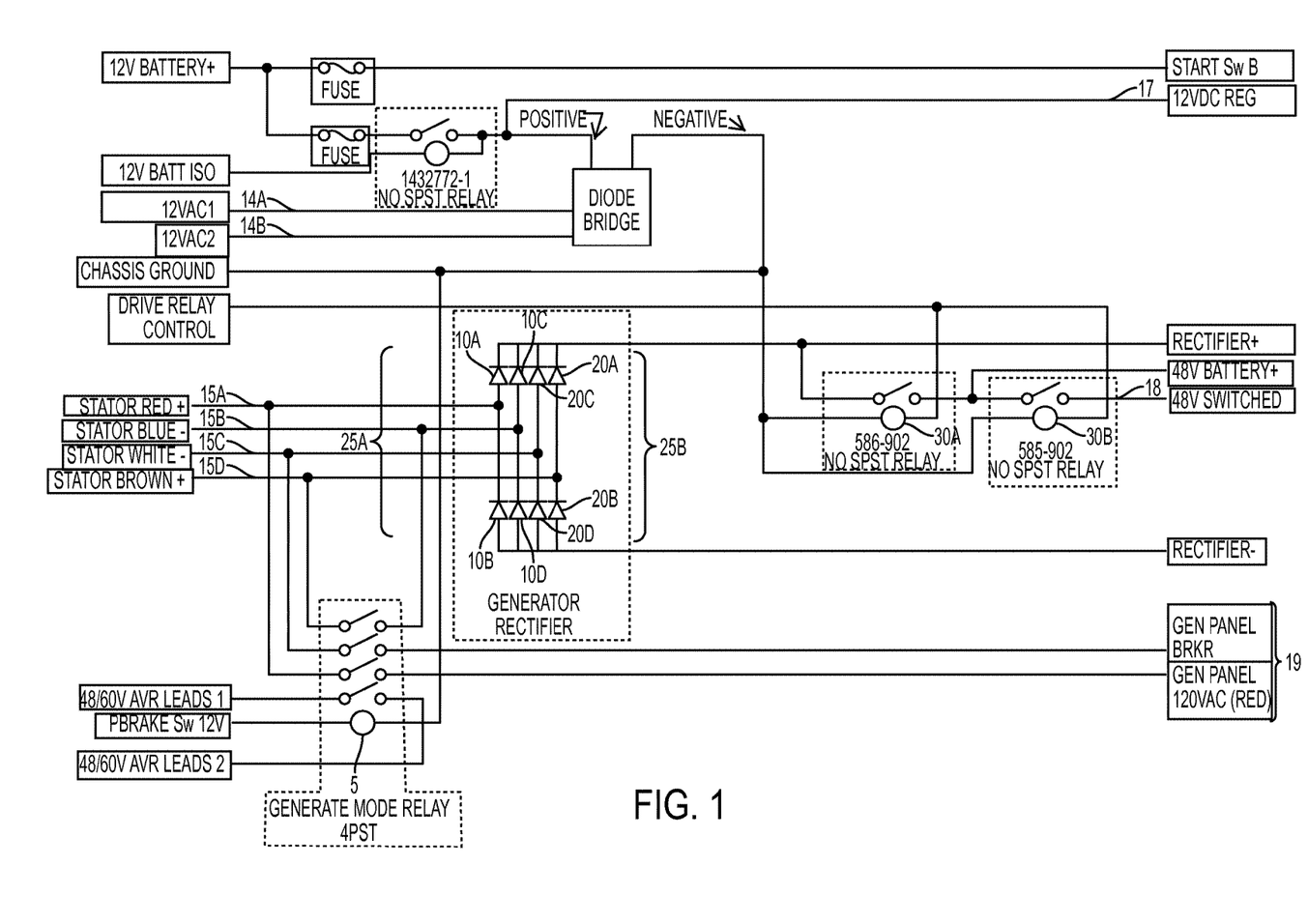
FIG. 1 is a plan view of a circuit schematic illustrating a power management system for implementing within a multi-purpose vehicle offering 48 VDC power signals to motors on the MPV and 120 VAC outlets via an on board generator.
Figure 3:
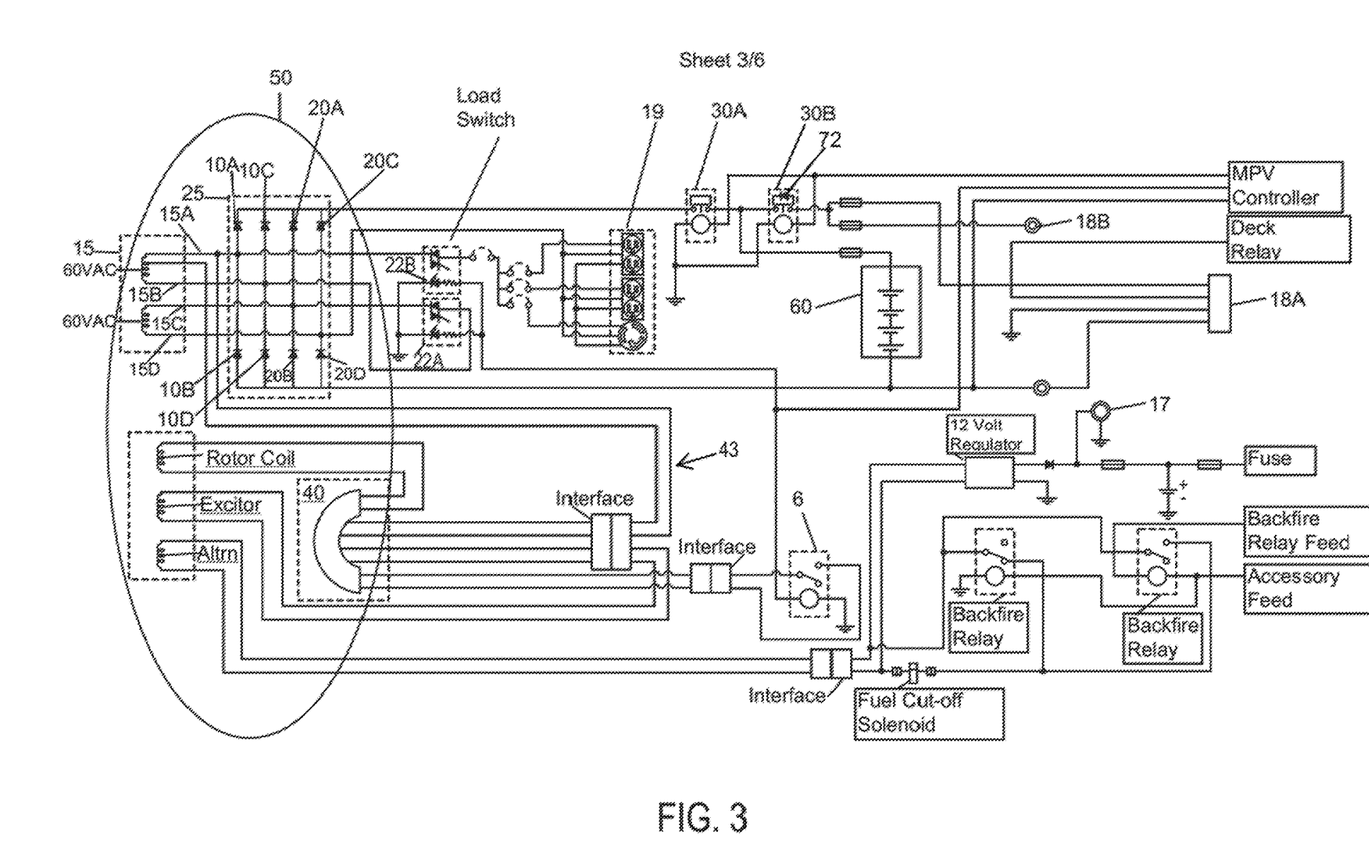
FIGS. 3-5 are plan views of circuit schematics illustrating a power management system for implementing within a multi-purpose vehicle offering 48 VDC signals via a voltage regulator attached to the generator and receiving an AC feedback signal from the rotor winding on the generator.

FIGS. 1 and 3 show an overview of the electrical control circuits of a multi-purpose vehicle (MPV) utilizing respective generator windings (14A, 14B; 15A, 15B; 15C, 15D) to provide 12 V DC output power (17) and either 48 V DC (18) or 120 V AC output (19).

The voltage output off the generator is controlled by specialty circuits that are shown in detail in a first configuration of FIGS. 1 and 2A, 2B, 2C, and 2D utilizing electromechanical relays, as well as a second configuration in FIG. 3 utilizing both electromechanical relays and solid state relays.

In operation, the generator has primary windings (15A, 15B, 15C, 15D) that are each capable of generating an approximate 50 VAC signal when operated in parallel and directed to a bridge rectifier (25). As shown in FIGS. 1 and 3 the bridge rectifier (25) actually encompasses two bridge rectifiers (25A, 25B) of four diodes each. In other words, a first bridge rectifier (25A) includes diodes 10A, 10B, 10C, and 10D arranged in a bridge circuit to convert the 50 VAC signal off a first generator winding (15A, 15B) to a first 48 V DC output (18) for the motor controllers (100, 105, 110) associated with the drive motor and blade motors respectively. A second bridge rectifier (25B) includes four diodes (20A, 20B, 20C, 20D) for generating a second 48V DC signal from another generator winding (15C, 15D) operated in parallel to the first 48 V DC signal.

The two generator windings (15A, 15B; 15C, 15D) may be switched between a parallel configuration (50 VAC mode) for 48 VDC output (18) and a series configuration (60 VAC mode) for 120 VAC output (19) (achieved by combining the two 60 VAC signals without rectification).

FIGS. 1 and 2 show a first embodiment of a power control system to be associated with a multi-purpose vehicle, including a drive motor and drive motor controller (100) as well as a blade motor and blade motor controller (105). Additionally, the multi-purpose vehicle includes outlets for 12 VDC (17) and 120 VAC (19) under particular conditions. In the embodiment of FIG. 1, a multi-pole switch (5) regulates the output of the diode bridges (10, 20) such that the generator windings (15) selectively operate in either 48 VDC parallel output configuration to supply motor controllers (100, 105) or dual 60 VAC (i.e., total 120 VAC output) for the user to access via a 120 VAC outlet (19). The normally open four pole single throw switch (5) disconnects the 120 VAC outlet (19) and allows for the two windings (15A, 15B; 15C, 15D) to direct respective 50 VAC signals to an appropriate diode bridge (25A, 25B) to rectify each input voltage signal and provide parallel 48 VDC output to the motors and controllers (100, 105), and charge the 48 VDC battery pack. When appropriate conditions are met for using the drive motor and the blade motor on the MPV, single pole single throw switches (30A, 30B) close to direct the 48 VDC rectified signals, in parallel, to the motors and battery. While one of the switches is useful to actually select the option of sending a voltage signal to the motors, the other switch is necessary to ensure that the motors do not drain a battery (FIG. 2, Ref. 60) also operated in parallel with the 48 VDC generator output signals.

The embodiment of FIG. 1 is notable in its switching between the rectified 48 VDC parallel outputs through respective diode bridges (25A, 25B) and series 60 VAC outputs that bypass the rectification. The series output (totaling 120 VAC) is accomplished by closing the multi-pole switch (5) to short circuit the positive winding wire (15D) of the second generator winding (15C, 15D) with the negative winding wire (15B) of the first generator winding (15A, 15B). In essence, the output from the generator windings (15A, 15B, 15C, 15D) is sent along an essentially single winding from the positive wire (15A) of the first winding to the negative wire (15C) of the second generator winding. The combined 120 VAC signal is available at outlet terminals (19).

Figures 2A, 2B, 2C, 2D:
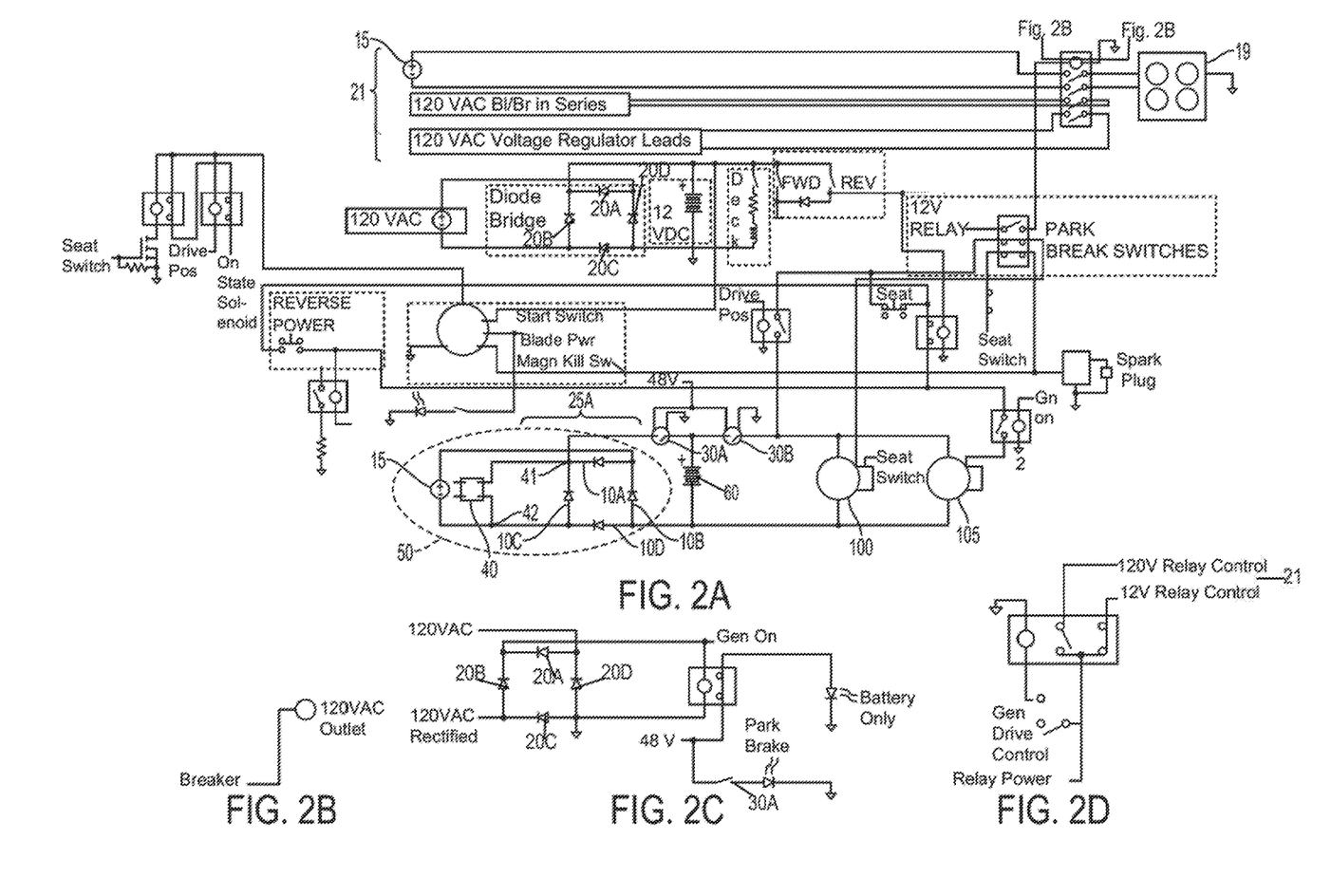
FIGS. 2A, 2B, 2C, and 2D are plan views of circuit schematics illustrating a power management system for implementing within a multi-purpose vehicle offering 48 VDC signals via a voltage regulator attached to the generator receiving a DC feedback signal from a diode bridge.

In the non-limiting example of FIG. 2D, the motor controllers are included, respectively, on a drive motor that drives the wheels on the MPV and a blade motor that operates a cutting blade, allowing the unit to be used as a lawn mower and using the portion of the control circuit encircled and labeled as Reference No. 50. In this portion of the control circuit, the motors have respective controllers (100, 105) requiring 48V DC power from the generator windings (15) and rectifier (25). In a different option, also available as shown in FIG. 2D and labeled as Reference No. 21, the control circuit allows a user to access 120 VAC output from outlets (19) shown in FIG. 2A.

The two configurations (21, 50) are separately available in the control system disclosed herein. As shown in the highlighted area (50) of the MPV control circuit (i.e., the portion of the drawing encircled by the dotted elliptical line), one of the two generator windings (15A, 15B, 15C, 15D) from FIG. 1 directs a 60 VAC signal to a first bank of diodes (10A, 10B, 10C, 10D) in a first rectifier circuit (25A). The elliptical marking (50) illustrates an option in the control circuit for powering motor controllers (100, 105) so that the generator windings (15) are connected to a voltage regulator (40) and bridge rectifiers (25A) providing a 48 VDC output to the motor controllers so that the controllers can energize the motors for driving a multipurpose vehicle or for driving the vehicle with a blade running. The portion of the circuit encircled with the elliptical (50) illustrates one non-limiting example of a mechanism for selecting 48 VDC output from the generator windings (15) and ensuring that the motor controllers (100, 105) each receive a consistent 48 VDC signal for uninterrupted operation. The uninterrupted power availability at the motors is accomplished by two features shown in FIG. 2A, the voltage regulator (40) and the 48 VDC battery (60) in parallel with the generator windings (15). In general, the motor controllers (100, 105) draw from the battery (60) only as needed to maintain smooth operation. The predominant power source is the generator with first and second windings (15A, 15B, 15C, 15D) providing parallel 50 VAC signals through the diode bridges (25) resulting in a 48 VDC rectified signal available to the motor controllers (100, 105). The voltage regulator (40) of FIG. 2D includes an excitation coil and transistor that feeds the rotor coil in the generator to govern the output of the generator windings (15). The voltage regulator, therefore, receives feedback from the motor power circuit to determine if the generator output is either over or under as compared to the load at the motor controllers (100, 105).

Figure 4:
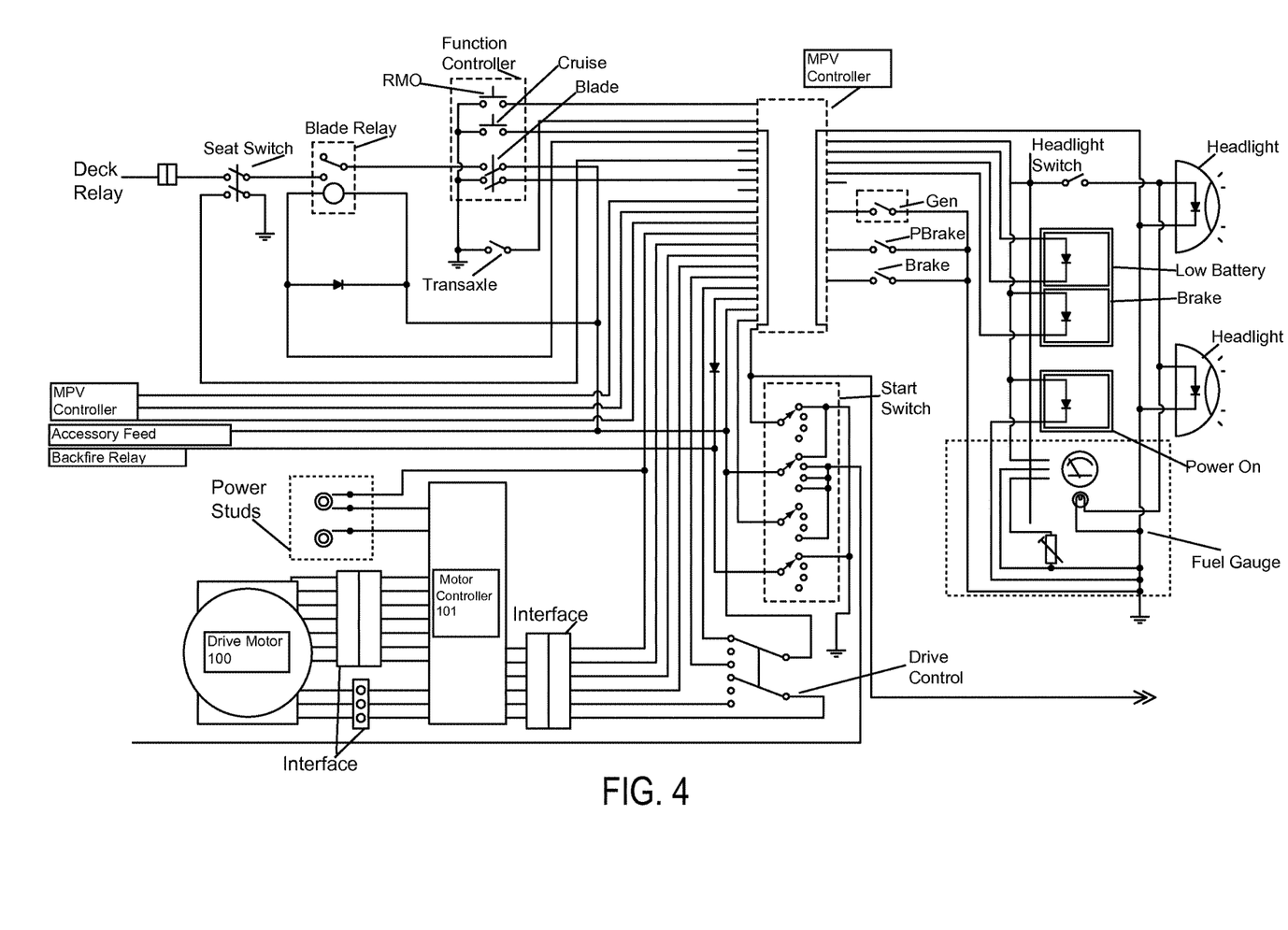
Figure 5:
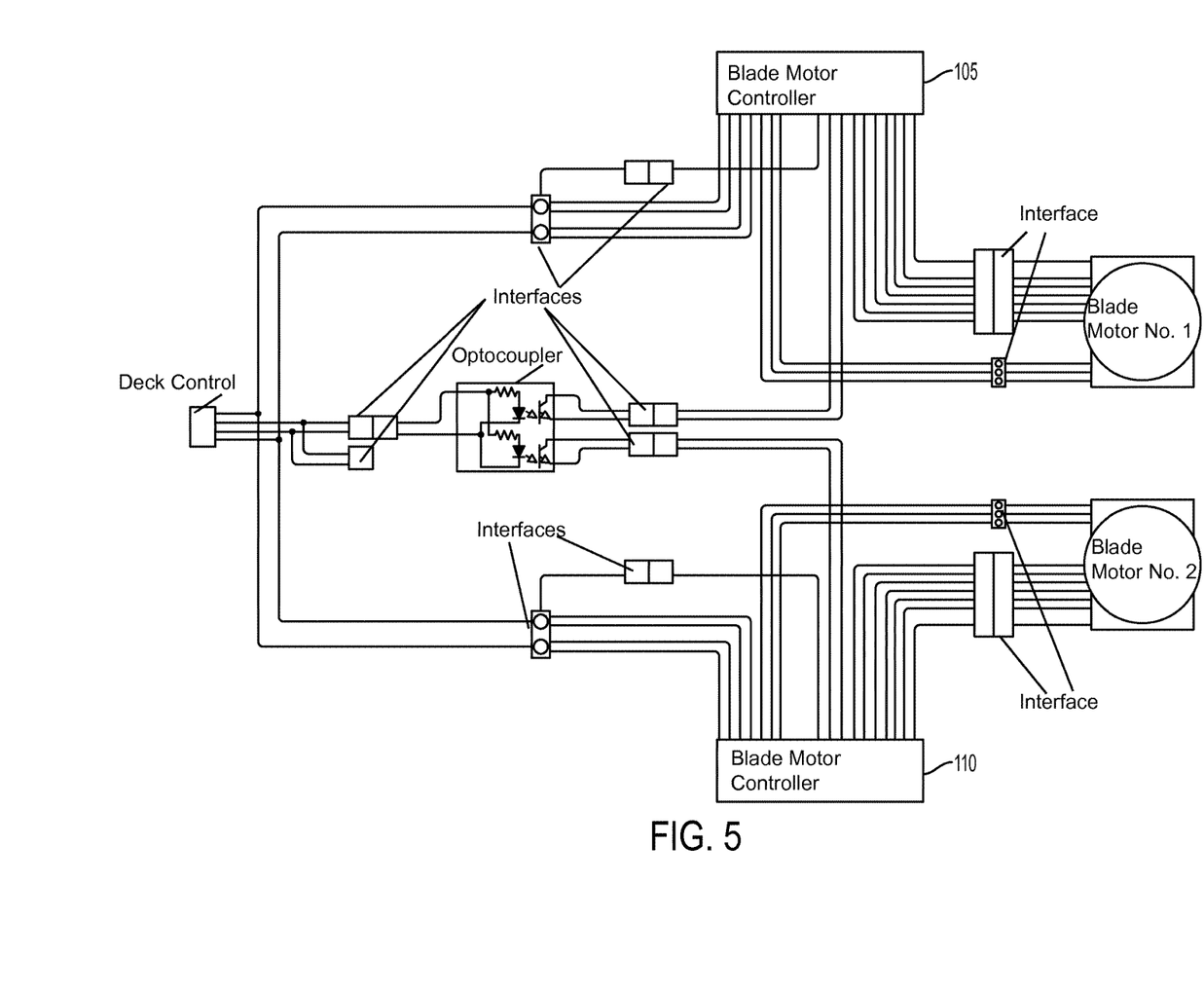
Figure 6:
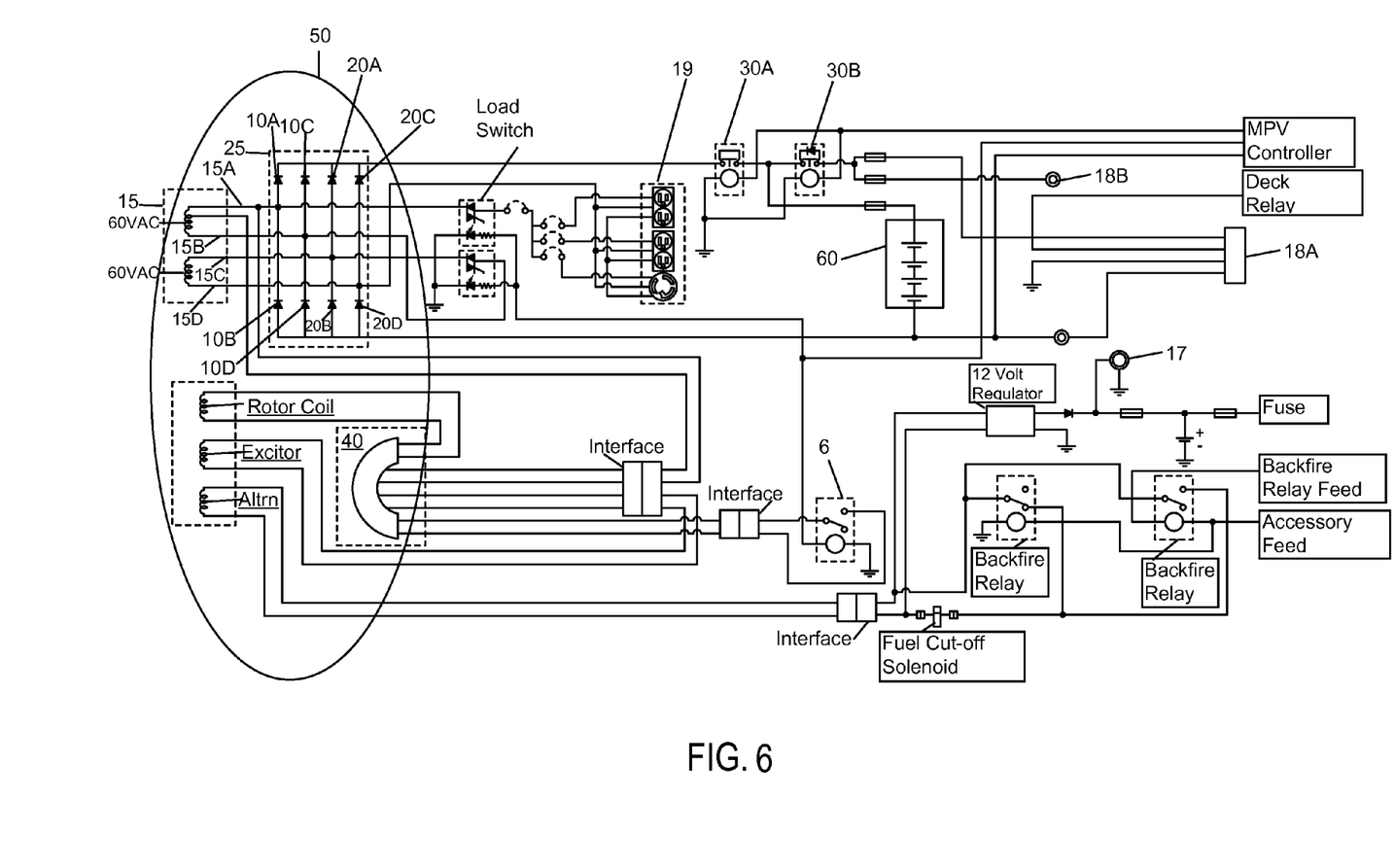

The non-limiting example, shown in different levels of detail in FIGS. 3, 4, and 5, show a second embodiment of a power control system to be associated with a multi-purpose vehicle, including a drive motor and drive motor controller (100), as well as blade motors and blade motor controllers (105, 110). Additionally, the multi-purpose vehicle includes outlets for 12 VDC (17) and 120 VAC (19) under particular conditions. In the embodiments of FIGS. 3 and 4, the voltage regulator (40), regulator relay (6), solid state relay (22A), and 48 VDC system contactors (30A, 30B) regulate the output of the diode bridges (10, 20) such that the generator windings (15) selectively operate in either 50 VAC mode or 48 VDC parallel output configurations to supply motor controllers (100, 105, 110) and battery (60), or dual 60 VAC mode (i.e., total 120 VAC output) for the user to access via a 120 VAC outlet (19). The normally open solid state relay (22B) disconnects the 120 VAC outlet (19) and allows for the two windings (15A, 15B; 15C, 15D) to direct respective 50 VAC signals to an appropriate diode bridge (25A, 25B) to rectify each winding voltage signal (15A, 15B; 15C, 15D)

and provide parallel 48 VDC output to the motors and controllers (100, 105, 110), and charge the 48 VDC battery pack. When appropriate conditions are met for using the drive motor and the blade motor on the MPV, single pole single throw switches (30A, 30B) close to direct the 48 VDC rectified signals, in parallel, to the motors and battery. One of the switches (30A) is used to isolate the 48 VDC system from the rectifier bridge (25) during 120 VAC mode, and (30B) protects the battery charge, ensuring that the motors do not drain the battery (60) when the control circuit is inactive.

The embodiment of FIGS. 3 and 4 is notable in its switching between the rectified 48 VDC parallel outputs through respective diode bridges (25A, 25B) and series 60 VAC outputs that bypass the rectification. The series output (totaling 120 VAC) is accomplished by closing the solid state relay (22A) to short circuit the positive winding wire (15D) of the second generator winding (15C, 15D) with the negative winding wire (15B) of the first generator winding (15A, 15B). In essence, the output from the generator windings (15A, 15B, 15C, 15D) is sent along an essentially single winding from the positive wire (15A) of the first winding to the negative wire (15C) of the second generator winding. The combined 120 VAC signal is available at outlet terminals (19).

In the non-limiting example of FIGS. 3-5, the motor controllers include a drive motor(s) that drives the wheels on the MPV and blade motors that operate cutting blades, allowing the unit to be used as a lawn mower and using the portion of the control circuit encircled and labeled as Reference No. 50. In this portion of the control circuit, the motors have respective controllers (100, 105, 110) requiring 48V DC power from the generator windings (15) and rectifier (25). In a different option, also available as shown in FIG. 2D and labeled as Reference No. 21, the control circuit allows a user to access 120 VAC output from outlets (19) shown in FIG. 2A. Accessories powered by the MPV generator/battery are not limited to a mowing deck or 48 VDC.

The two configurations (21, 50) are separately available in the control system disclosed herein. As shown in the highlighted area (50) of the MPV control circuit (i.e., the portion of the drawing encircled by the elliptical line), one of the two generator windings (15A, 15B, 15C, 15D) from FIG. 3 directs a 50 VAC signal to a first bank of diodes (10A, 10B, 10C, 10D) in a first rectifier circuit (25A). The elliptical marking (50) illustrates an option in the control circuit for powering motor controllers (100, 105, 110) so that the generator windings (15) are connected to a voltage regulator (40) and bridge rectifiers (25) providing a 48 VDC output to the motor controllers so that the controllers can energize the motors for driving a multipurpose vehicle or for driving the vehicle with a blade running. The portion of the circuit encircled with the elliptical (50) illustrates one non-limiting example of a mechanism for selecting 48 VDC output from the generator windings (15) and ensuring that the motor controllers (100, 105, 110) each receive a consistent 48 VDC signal for uninterrupted operation. The uninterrupted power availability at the motors is accomplished by two features shown in FIG. 3—the voltage regulator (40) and the 48 VDC battery (60) in parallel with the generator windings (15). In general, the motor controllers (100, 105, 110) draw from the battery (60) only as needed to maintain smooth operation. The predominant power source is the generator with first and second windings (15A, 15B, 15C, 15D) providing parallel 50 VAC signal through the diode bridges (25) resulting in a 48 VDC rectified signal available to the motor controllers (100, 105, 110). The voltage regulator (40) of FIG. 3 includes an excitation coil and transistor that feed the rotor coil in the generator to govern the output of the generator windings (15). The voltage regulator, therefore, receives feedback from the motor power circuit to determine if the generator output is either over or under as compared to the load at the motor controllers (100, 105, 110). In one aspect of the invention disclosed herein, the voltage regulator (40) receives feedback from the DC signal output of the diode bridges (25). This DC feedback is a close approximation of the actual power availability at the motor controllers (100, 105, 110). Using the signal (41, 42) from the diode bridge (25) as feedback to the voltage regulator (40) requires a proper tuning circuit in the voltage regulator to account for the delay that may be present when the voltage regulator (40) receives the feedback signal (41, 42) leading the generator windings (15) to respond by overshooting or undershooting the real time load at the motor controllers. In any event, however, the feedback signal (41, 42), when coupled with a proper tuning circuit in the voltage regulator (40), provides a high quality indication of the actual system voltage signal sent to the motor controllers and battery after rectification than other points in the circuitry can provide.

FIG. 3 illustrates yet another embodiment of the control circuit disclosed herein. In FIG. 3, the portion of the circuit encircled with the elliptical (50) illustrates that the voltage regulator (40) draws the feedback signal (43) directly off the generator rotor stator windings (15) when the control circuit is operating in both 120 VAC mode and 48 VDC mode. This arrangement avoids the tuning necessary in the voltage regulator (40) when the feedback signal is fed to the voltage regulator post rectification.

FIGS. 3 and 4 also utilizes a simpler switching mechanism for achieving series 60 VAC outputs to the 120 VAC outlets (19). A single pole relay (22A) is utilized to connect the stator windings (15) in series. Relay (22B) disconnects the 120 VAC outlets (19) when the MPV in not intended to generate 120 VAC. Again battery switches (30A, 30B) are used to isolate the 48 VDC system from the rectifier bridge during 120 VAC mode and to protect battery charge when the control circuit is inactive.

Another aspect shown in the drawings as one embodiment is the use of three phase brushless AC motors having controllers with respective inverters receiving the output voltage from the rectifier circuit. These AC motors utilize RPM control of the motor instead of older model DC motor control. The rectifier output DC voltage powers the inverters to yield three phase alternating current. During operation of the AC motors, the back circuit through the inverter (AC signal from the running motor back through the inverter to provide a DC signal back to the battery) is available during motor load reduction to charge the battery via the back circuit. This also brakes torque supplied to blades or drive mechanisms by the motor as energy takes time to dissipate from the motor. In other words, during shut down of an active state, such as during the time that a user stops a hybrid vehicle operating both the drive train and the blades on the mowing option, the motors are actually able to charge the batteries via the above noted back circuit. During this shut-down, such as when the user operates an immediate "kill-switch" to stop powering a motors, such as a blade motor, the time during which the motor continues to turn due to the residual forces of the motion of the blade, actually generates a back current, an AC signal, that is transmitted back to the inverter, converted to DC, and is available to charge the battery via the back circuit from the motor controller to the battery. This charging action actually brakes the blades or other equipment attached to a motor so that the blades, in particular, stop moving within an appropriate amount of time.

Use of RPM control, via three phase AC motors, is one advantage of the use of AC motors to take advantage of controlled braking during shut down events. The frequency control available in an AC motor, particularly used for blade motors in an MPV as disclosed herein, is a distinct control factor in the overall control system as set forth herein. The back circuit described above for braking eliminates not only mechanical system braking of devices such as blades operating at maximum ANSI ratings but also eliminates other circuit components (e.g., braking resistors) necessary in older systems, such as DC motor controllers.

Another scenario worth mentioning is during the user's operation of the ignition key suddenly (i.e., suddenly switching off a hybrid vehicle via the ignition key, even when the hybrid vehicle is a multi-purpose vehicle with an engine actively powering the drive train and an associated generator actively powering the blade motors). In this scenario, the switch or relay contactors (30A, 30B) used to isolate the battery during operation of the 120 VAC outlets (i.e., when the drive motor and blade motor are inactive), must be configured to avoid an open circuit at the contactors (30A, 30B). When the ignition key is switched off, and the contactors (30A, 30B) open the above noted back circuit from the motors needs an outlet toward the battery for momentary battery charging while the blade or drive motors continue to turn. One consideration to provide the proper circuit for this scenario is to use a reversed diode (72) between the battery (60) and the motors (100, 105) to provide a circuit path from the motor controllers/inverters back to the battery while bypassing at least one contactor (30B). The term reversed diode is meant to encompass any circuit component directing current only one way from a positive terminal at an end proximate the motors and a negative terminal at the end proximate the battery.

This disclosure, including the drawings, comprehensively sets forth a control system and the appropriate mechanical components to enable a multi-purpose vehicle having a drive train for use in combination with mowing blades or other attachments (e.g., a snow plow or snow blower). As noted in detail above, the vehicle is configured to utilize generated power and battery power to both drive the vehicle and the blades or attached components. In a separate power configuration, the vehicle offers outlets for 120 VAC power consumption via the same generators noted above. FIG. 1 illustrates a switch (5) used to isolate the different modes of use—i.e., there are separate and isolated circuits for the parallel generator/battery operation when the vehicle operates with the blade motors and drive motors active, and the serial generator configuration for 120 VAC outlet use.

Several embodiments of the control system of this invention are set forth in the claims below.

The invention claimed is:

1. A control system for operating at least one motor via a generator and a battery, the system comprising:
    a voltage regulator receiving an input alternating (AC) current from the generator and transmitting an excitation current to the generator in response to said input alternating (AC) current;
    a rectifier receiving an output alternating (AC) current from said voltage regulator and distributing a direct (DC) output current to the motor, said rectifier defining at least one output node and a ground node at which an output voltage is available for distribution to the battery and the motor,
    wherein said output voltage determines a feedback signal transmitted back to said voltage regulator, and
    wherein said voltage regulator adjusts said excitation current in response to said feedback signal.

2. A control system for use in generating power in a hybrid vehicle having at least one motor supplied with both generated power and battery stored potential, the control system comprising:
    a voltage regulator receiving an input alternating (AC) current from the generator and transmitting an excitation current to the generator in response to said input alternating (AC) current;
    a rectifier receiving an output alternating (AC) current from said voltage regulator and distributing a direct (DC) output current to the motor, said rectifier defining at least one output node and a ground node such that an output voltage is available for distribution to the battery and the motor,
    wherein said output voltage determines a feedback signal transmitted back to said voltage regulator and wherein said voltage regulator adjusts said excitation current in response to said feedback signal; and
    an inverter receiving said output voltage and powering an alternating current motor connected to the control system.

3. A control system for use in generating power in a hybrid vehicle having at least one motor supplied with both generated power and battery power, the control system comprising:
    a voltage regulator receiving an input alternating (AC) current from the generator and transmitting an excitation current to the generator in response to said input alternating (AC) current;
    a rectifier receiving an output alternating (AC) current from said voltage regulator and distributing a direct (DC) output current to the motor, said rectifier defining at least one output node and a ground node such that an output voltage is available for distribution to the battery and the motor,
    wherein said output voltage determines a feedback signal transmitted back to said voltage regulator and wherein said voltage regulator adjusts said excitation current in response to said feedback signal;
    a motor controller receiving said output voltage and powering an alternating current (AC) motor via an inverter connected to the controller, wherein said inverter brakes said motor in response to a reduction in motor power consumption.

* * * * *